(12) United States Patent
Scheirey et al.

(10) Patent No.: US 9,456,020 B2
(45) Date of Patent: *Sep. 27, 2016

(54) METHODS AND SYSTEMS FOR TRANSMITTING SYNCHRONIZED VISUAL AND AUDIO MEDIA

(71) Applicant: Hillcrest Laboratories, Inc., Rockville, MD (US)

(72) Inventors: Stephen Scheirey, Urbana, MD (US); Daniel Ramagem, North Bethesda, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,436

(22) Filed: Jul. 25, 2013

(65) Prior Publication Data

US 2013/0342760 A1   Dec. 26, 2013

Related U.S. Application Data

(63) Continuation of application No. 13/126,812, filed as application No. PCT/US2009/063374 on Nov. 5, 2009, now Pat. No. 8,522,298.

(60) Provisional application No. 61/112,230, filed on Nov. 7, 2008.

(51) Int. Cl.
*H04N 7/173* (2011.01)
*H04N 5/445* (2011.01)
(Continued)

(52) U.S. Cl.
CPC ............. *H04L 67/02* (2013.01); *H04N 5/067* (2013.01); *H04N 7/173* (2013.01); *H04N 21/2665* (2013.01); *H04N 21/26258* (2013.01); *H04N 21/41415* (2013.01)

(58) Field of Classification Search
CPC ................ H04N 21/4622; H04N 5/44543; H04N 21/4307
USPC ................ 725/119–120, 105, 41, 44–48, 51, 725/93–94, 109, 110, 115–117, 145–146; 348/500; 707/661; 709/204
See application file for complete search history.

(56) References Cited

U.S. PATENT DOCUMENTS 7,444,659 B2 * 10/2008 Lemmons .......... H04N 7/17318
                                                              375/E7.006
7,908,629 B2 *  3/2011 Lewis ................ H04N 1/00132
                                                              348/14.09

(Continued)

FOREIGN PATENT DOCUMENTS

WO       2008/115564  A2      9/2008

OTHER PUBLICATIONS

International Search Report for application No. PCT/US2009/063375, mailed on Jun. 7, 2010.

(Continued)

*Primary Examiner* — Jefferey Harold
*Assistant Examiner* — Omer Khalid
(74) *Attorney, Agent, or Firm* — Patent Portfolio Builders PLLC

(57) ABSTRACT

Systems and methods according to the present invention provide methods, devices and systems for delivering media content to users. Broadcast audio and video streams can be synchronized for substantially simultaneous output by users. User feedback can be used to compose playlists of synchronized media.

5 Claims, 9 Drawing Sheets

(51) Int. Cl.
  *H04N 7/16* (2011.01)
  *H04L 29/08* (2006.01)
  *H04N 21/262* (2011.01)
  *H04N 21/2665* (2011.01)
  *H04N 21/414* (2011.01)
  *H04N 5/067* (2006.01)

(56) References Cited

U.S. PATENT DOCUMENTS

| | | | | |
|---|---|---|---|---|
| 2004/0054542 | A1* | 3/2004 | Foote | G09B 5/00 704/500 |
| 2005/0287971 | A1 | 12/2005 | Christensen et al. | |
| 2006/0053342 | A1* | 3/2006 | Bazakos | G06K 9/00335 714/37 |
| 2007/0011237 | A1* | 1/2007 | Mockett | H04L 65/4076 709/204 |
| 2008/0032739 | A1* | 2/2008 | Hoodbhoy | G06Q 30/02 455/556.2 |
| 2008/0209075 | A1 | 8/2008 | Shamma | |

OTHER PUBLICATIONS

Written Opinion for application No. PCT/US2009/063375, mailed on Jun. 7, 2010.
William McKeen, Tampabay.com Know it Now, "The Endangered Joy of Serendipity" retrieved Jul. 31, 2008 <http://www.sptimes.com/2006/03/26/news_pf/perspective/The_endangered_joy_of.shtml>.
O'Reilly, O'Reilly Network: "What Is Web 2.0, Design Patterns and Business Models for the Next Generation of Software" retrieved Aug. 22, 2008, <http://www.oreillynet.com/lpt/a/6228>.
Wikipedia—Internet Radio, retrieved Sep. 6, 2008, <http://en.wikipedia.org/w/index.php?title=Internet_radio&printable=yes>.
Wikipedia—Flickr, retrieved Sep. 6, 2008, <http://en.wikipedia.org/w/index.php?title=Flickr&printable=yes>.

* cited by examiner

CHANNEL 5 SCHEDULE — 702

10:00 IRELAND

10:30 CROATIA 2008 EURO CHAMPIONS
 - CONGRATULATIONS

11:00 USER CITY CHOICE (VOTE NOW)
 - LONDON
 - MADRID
 - BERLIN

11:30 EUROPE TODAY

FIG. 7

METHODS AND SYSTEMS FOR TRANSMITTING SYNCHRONIZED VISUAL AND AUDIO MEDIA

RELATED APPLICATIONS

This application is a continuation of U.S. patent application Ser. No. 13/126,812, filed on Jun. 6, 2011, entitled "Methods and Systems for Transmitting Synchronized Visual and Audio Media", which is a 371 of International Application No. PCT/US2009/063374, filed Nov. 5, 2009, now International Publication No. WO 2010/054060 which published May 14, 2010, which is related to and claims priority from, U.S. Provisional Patent Application No. 61/112,230, filed on Nov. 7, 2008, entitled "Methods and Systems for Transmitting Synchronized Visual and Audio Media", the disclosure of which is incorporated here by reference.

TECHNICAL FIELD

The present invention generally relates to systems, devices, software and methods for transmitting and receiving media.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

As technology continues to move forward, both the control systems and the physical pipelines for delivering information have improved to the point that service providers are delivering more services to more platforms. For example, audio and visual media can be delivered to phones, movies can be streamed from a server to computer or television for viewing over the Internet and other communication networks, and interactive requests can be sent from individual users over various devices for a variety of services, e.g., purchases via credit card and polling information. Some of these new options have led people to rethink business models when using the Internet and/or other networks for delivering services. For example, there is a growing movement from more traditional Internet business models, e.g., models that rely upon publishing, to those that use a newer philosophy such as, for example, participation models. One way to describe the differences between these models is to consider that publishing models generally rely upon internal resources for all of the database/knowledge filling associated with the service offering, whereas participation models allow a company to rely upon the users for all or parts of the database/knowledge filling associated with the service offering, which can in turn be used for revenue generation.

Accordingly, it would be desirable to provide new methods, devices and systems for delivering media content to users which may take into consideration such paradigm shifts.

SUMMARY

According to exemplary embodiments, a method for broadcasting synchronized photographs and music to a plurality of devices includes: generating program contents, wherein the program contents include information associated with the synchronized photographs and music which are related to a specific topic; transmitting a first control signal toward a photo server; transmitting a second control signal toward an audio server; transmitting a playlist toward the plurality of devices; transmitting a first multicast broadcast from the photo server in response to the first control signal; transmitting a second multicast broadcast from the audio server in response to the second control signal; providing interactive content in the first multicast; receiving uploaded photographs at the photo server for use in generating the program contents; and synchronizing the first and second multicast broadcasts.

According to exemplary embodiments, a method for delivering visual and audio media content includes: generating program contents, wherein the program contents include information associated with the visual and audio media; transmitting a plurality of control signals; delivering the visual and audio media via multicast signaling; providing interactive content; and synchronizing the visual and audio media.

According to exemplary embodiments, a device for controlling media content delivery includes: a processor which reads master program lists and based upon the master program lists generates instructions for delivering synchronized photographs and music via multicast signaling; an interface for transmitting the instructions and receiving information; and a memory for storing information associated with the master program lists; wherein the device supports a web page which allows for two way interactions.

BRIEF DESCRIPTION OF THE DRAWINGS

The accompanying drawings illustrate exemplary embodiments, wherein:

FIG. 7 depicts a channel schedule according to an exemplary embodiment;

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
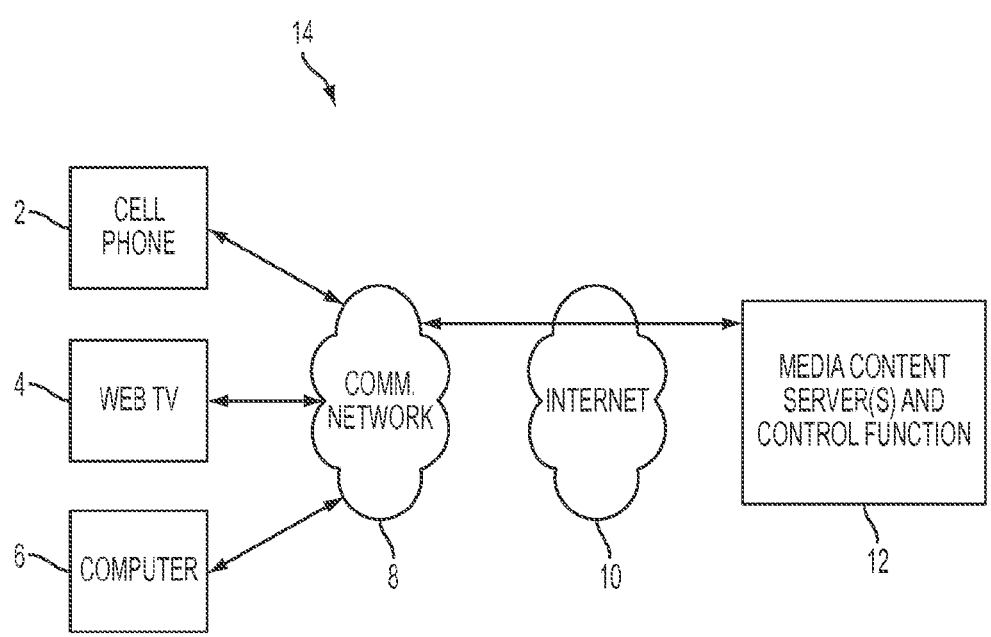
FIG. 1 depicts a network according to an exemplary embodiment.

In order to provide some context for this discussion, an exemplary network 14 is presented for receiving and delivering media content as shown in FIG. 1. According to exemplary embodiments, network 14 includes user devices, e.g., cell phone 2, web television (TV) 4 and computer 6, which are capable of transmitting and receiving both media content and control information from media content server(s) and control function 12. These communications can be transmitted over other networks, such as, the Internet 10 and a communication network 8, which the end user devices are currently associated with. While communication network 8 and the Internet 10 are shown, more, fewer or different networks can be used for delivering information between media content server(s) and control function 12 and the end user devices shown in FIG. 1. Examples of the media content which can be transmitted over exemplary network 14 are audio and video media which are synchronized with each other when displayed at an end user device, e.g., cell phone 2. Additionally, the data can be transmitted in multiple forms, such as, for example, Internet Protocol (IP) packets.

According to exemplary embodiments, media content server(s) and control function 12 as shown in FIG. 1, is a representation of the various servers, communication links, databases and control function hardware/software which can be used to both generate and control the outgoing media content as well as handle incoming requests. A more detailed exemplary embodiment for the media content server(s) and control function 12 will now be described with respect to FIG. 2.

According to exemplary embodiments, media content server(s) and control function 12 includes the elements shown to the right of dashed line 232, i.e., a photo server 216, a control server 222, an audio server 224 and a program content function 228. Photo server 216 represents one or more servers which have photographs and/or video stored therein and which can stream or otherwise deliver such media upon command, e.g., such as the servers available at www.flickr.com. Audio server 224 represents one or more servers which have audio files, e.g., music and spoken content, stored therein and which can stream or otherwise deliver such media content. Control server 222 is a server which controls the program flow according to these exemplary embodiments and ensures that the audio files are in synchronization with the photographs (or video) when displayed and heard by an end user device, e.g., cell phone 2. Program content function 228 stores the desired programming and, in conjunction with the control server 222, generates instructions and information regarding current and upcoming programming for viewing by an end user. Additionally, the program control function 228 allows for direct interaction by a person to modify or personalize upcoming programming as desired. The Internet 8 provides a communications interface between the photo server 216, the control server 222 and the audio server 224 to end user devices. However, other communication networks could be used in place of or in addition to the Internet 8. Communications associated with the media content that occur between the Internet 8 and other networks and end user devices are shown by communication link 202.

Figure 2:
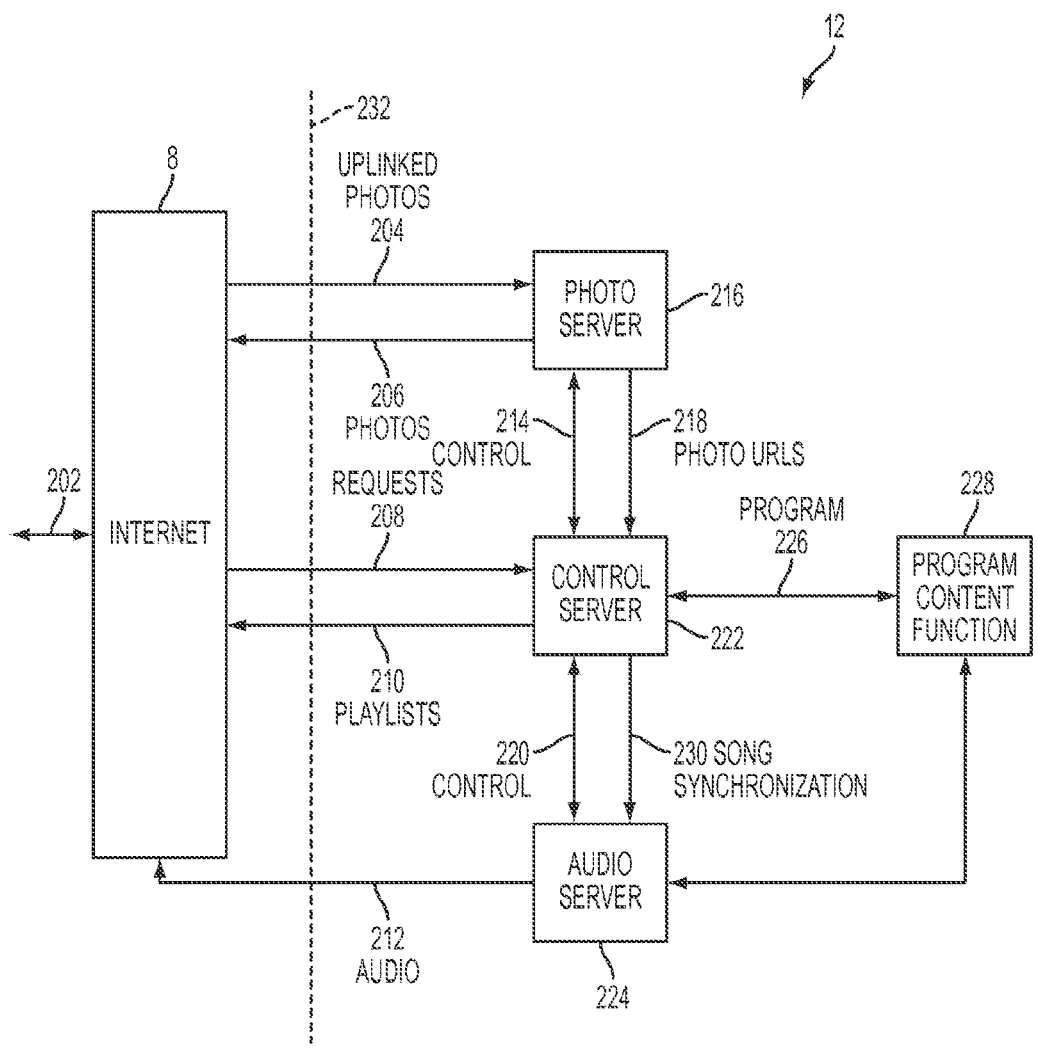
FIG. 2 depicts nodes and communication links for controlling, receiving and delivering media content according to exemplary embodiments.

According to exemplary embodiments, using the hardware and communication links shown in FIGS. 1 and 2, visual media, e.g., photographs, and audio media, e.g., music, can be delivered to an end user device to be displayed and heard in a synchronized manner. Initially, according to this exemplary embodiment, program information 226 is transmitted from the program content function 228 to the control server 222. From this, a playlist 210 can be transmitted from the control server 222 to end user devices, e.g., cell phone 2, web TV 4, and computer 6, when accessed by an end user device for viewing. User generated requests 208 or other information, e.g., information requests off of a service home page or polling information, can be received by the control server 222 and processed as needed. From the playlist 210, various channels, each of which is related to a topic, can be selected. This selection then allows the end user device to join the two multicasts, e.g., an audio channel and visual media channel associated with the selected channel, where both multicasts are synchronized to deliver the correct visual media and its associated audio. Alternatively, if photo server 216 and audio server 224 are implemented as a single server, each channel could be implemented as a single multicast including both audio and video content.

The photos 206 are transmitted from the photo server 216 toward an end user device. In a similar fashion the audio content 212, associated with the selected program and photos 206, is transmitted from the audio server 224. In this exemplary system, photos are pushed and audio is pulled. Control signaling 214, 220 is used to assist in synchronization and to ensure that the desired media content as described in the program information 226 is being transmitted. Song synchronization information 230 is transmitted from the control server 222 and the program content function 228 to the audio server 224. Additionally URLs to the photographs 218 are sent to the control server 222 from the photo server 216 to assist in the overall transmission and synchronization of the media content being transmitted from the various media servers.

According to exemplary embodiments, audio, e.g., music, is synchronized with the visual media content, e.g., photos, and output on an end user device as part of a broadcast service which (potentially) will be shared by a large number of users as part of a social network. This synchronization can occur through the use of various methods used in various combinations as desired. Some methods to support synchronization include buffering, control signaling, knowledge of audio file lengths and bandwidth management techniques. Multiple audio servers 224 can be used each of which can be synchronized with the master playlist associated with each program. Additionally, feedback can be received from end user devices to determine transmission factors, e.g., transmission lag. Knowledge of the transmission lag and other bandwidth considerations can allow the control server 222 to instruct end user devices, as needed, to skip the downloading of some photographs 206 as needed to maintain synchronization with the audio file.

The above described exemplary architecture can be used for two way communications between end user devices and media content server(s) and control function 12 for delivering synchronized audio and visual media content. For example, according to exemplary embodiments, consider a service provider named "Story Channel" which can provide multiple channels of synchronized audio and visual media content in a multicast format to a large number of end users. An end user can connect with Story Channel by, for example, typing in Story Channel's Uniform Resource Locator (URL), e.g., www.storychannel.com. This would result in the end user having a plurality of channels to choose from on the user interface (UI) of his or her end user device, each of which are providing synchronized audio and visual media content. This service could additionally have interactive elements where end users can upload photos, request channels, vote for future content and the like.

From the service provider end, additional interaction can occur by informing connected end users of upcoming events, upcoming and currently existing voting options, interactions with advertisements and the like. This combination of synchronized audio and visual media content coupled with interactive elements provide the ability to deliver new services which the end user could consider themselves a part of. In other words, the end users could have the ability to impact the delivered content or shape the manner in which the content is delivered in ways that are different from current services. More details regarding exemplary methods and systems for creating this interactive opportunity and the synchronized audio and visual media content will be described below.

Continuing with the Story Channel example, when users access Story Channel, various options can be presented to them. According to exemplary embodiments, the home page of Story Channel can have links and/or controls for a program guide, archives, directions for photo uploading, upcoming votes, the ability to vary the amount of space on the display taken by the photograph, advertisers and the like. Alternatively, some of this information could be shown immediately on the end user device's display instead of requiring the use of a link to access the information. To describe what the process may be like for a user to access media content and the associated experience according to an exemplary embodiment, FIGS. 3-7 will now be described.

Figure 3:
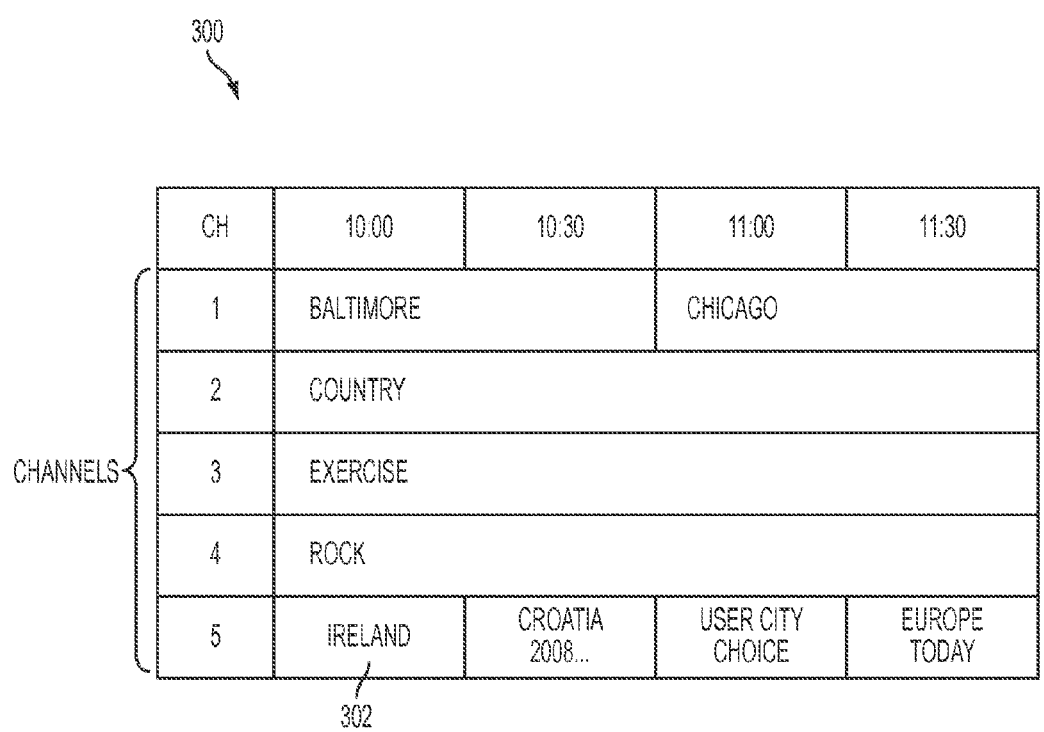
FIG. 3 shows a program guide according to an exemplary embodiment.

According to exemplary embodiments, when users access Story Channel they can access a broadcast program guide 300 via a display on their end user device, an example of which is shown in FIG. 3. Program guide 300 shows a snapshot of channels having programming information and associated broadcasting time. These channels are typically broadcasting photographs and synchronized music which are related to the topic listed in program guide 300 for each channel. For example, channel 5 is multicasting pictures and synchronized music associated with Ireland 302 at 1000. In addition to the pictures and music being associated with Ireland, the pictures and music can have additional tags which link them together or to other pictures. For example, an Irish golf course photograph could have tags for "golf" and "Ireland" which can also be linked with different programs and music. Assuming a user wants to access the Ireland 302 broadcast they could click on the channel number, click on the program Ireland 302, or the like for activating content.

Figure 4:
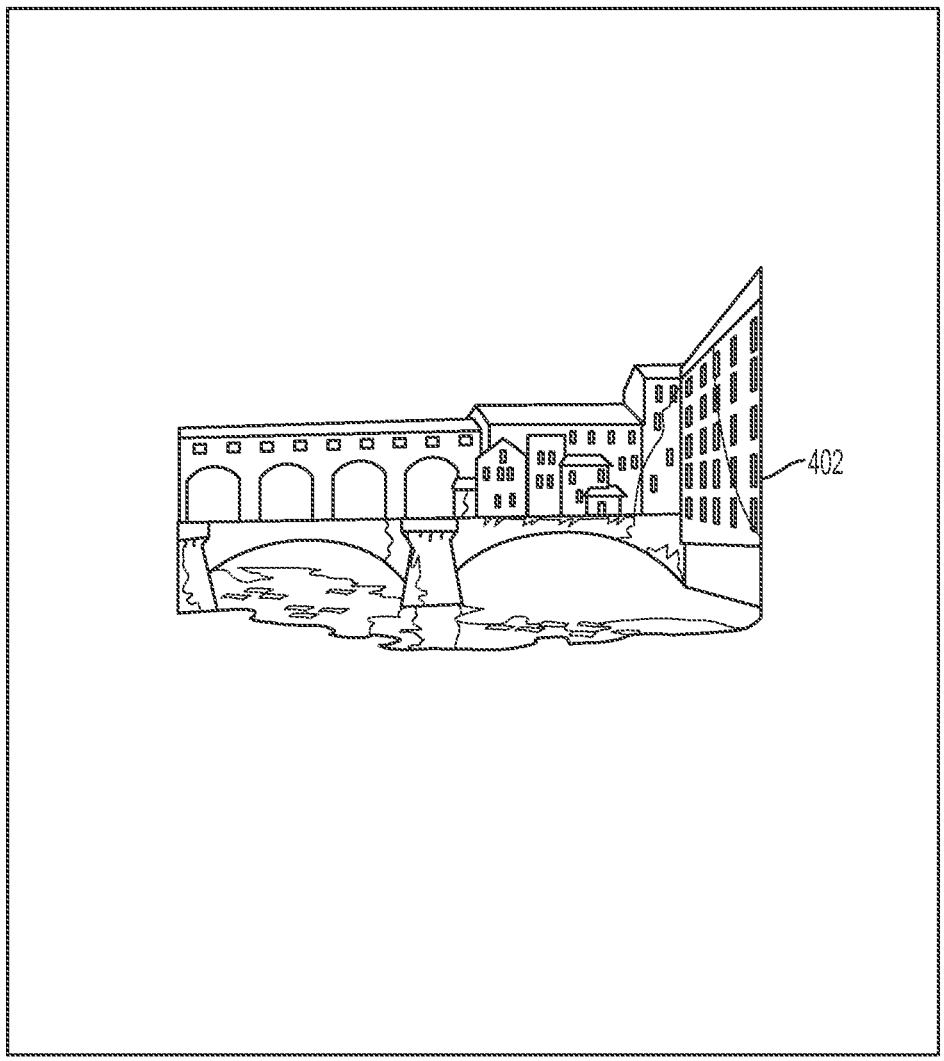
FIG. 4 shows a photo according to an exemplary embodiment.
Figure 5:
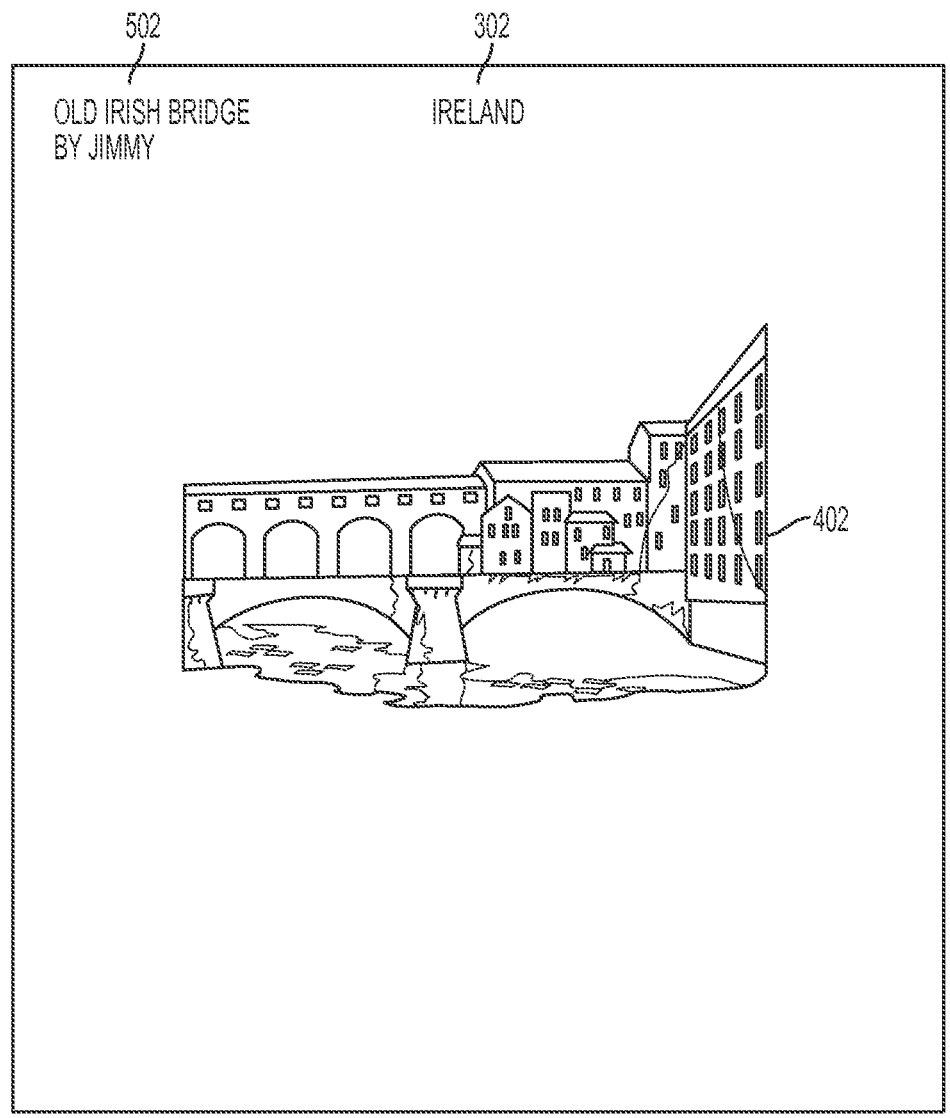
FIGS. 5-6 show a photo with overlay bugs according to exemplary embodiments.
Figure 6:
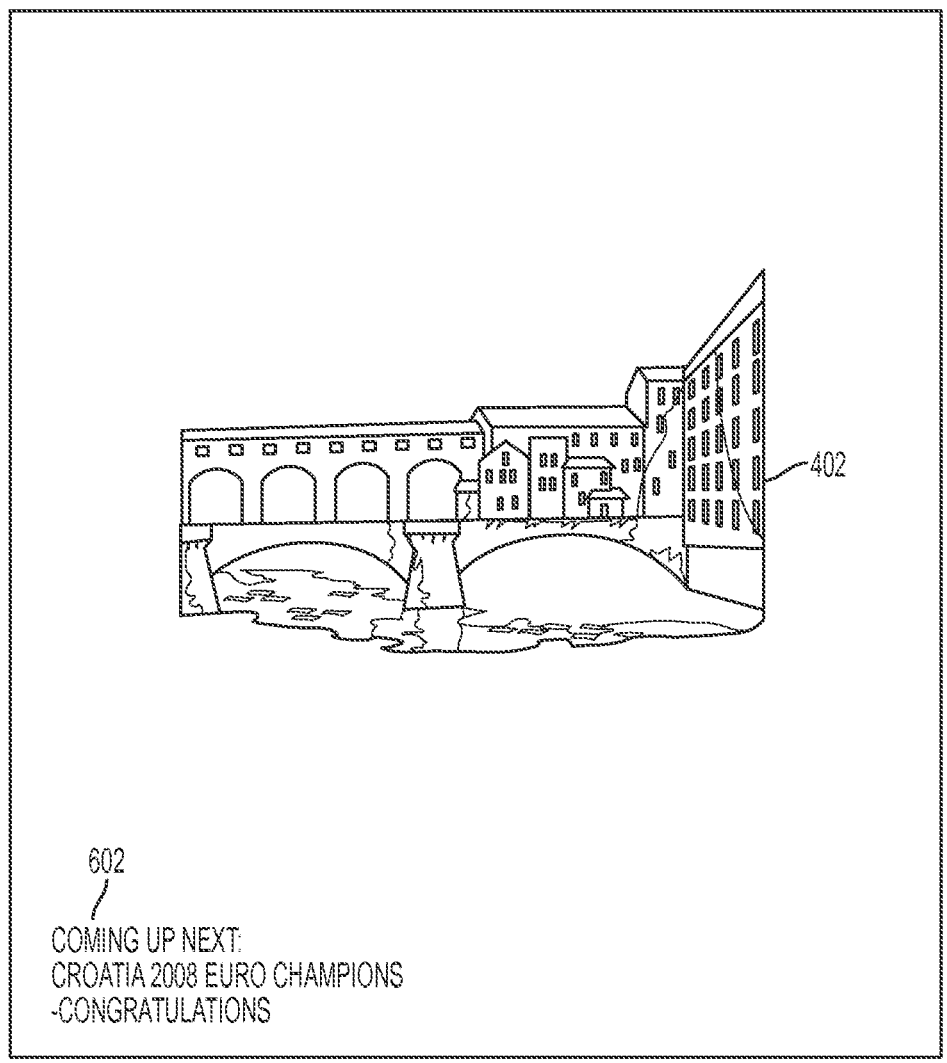

According to exemplary embodiments, after clicking on the Ireland 302 broadcast, the end user device joins the multicasts and begins to receive the current photograph and associated, synchronized music, an example of which is shown in FIG. 4. FIG. 4 shows a picture of an old Irish Bridge 402 (and while not seen, Irish tagged music is playing). Other photographs associated with Ireland in the program file for this program would be sent out over the multicast in a manner which is synchronized with the pre-selected Irish music. Preferably, song changes will coincide with a picture change, but not necessarily with each picture change. Additionally, various "bugs" can pop up on the photographs for differing time periods showing additionally information. For example, as shown in FIG. 5, a bug showing the channel name Ireland 302 and information regarding the photograph title or description and the photographer (or photograph submitter) 502 can be shown. Additionally, more information can be shown overlaid on a displayed photograph on the end user device's display (or adjacent to the displayed photograph) such as the current song name. As another example, when nearing the end of a song, information can be displayed to show the next song name, or when nearing the end of a program displaying, to show what is coming up next 602 as shown in FIG. 6. Alternatively, between songs or at other desired times, the schedule for the currently selected channel, e.g., channel 5 schedule 702, can be shown as seen in FIG. 7.

According to other exemplary embodiments, as the Ireland 302 slideshow is nearing its end, a bug can appear on the screen which shows the channel 5 schedule 702, but in a reduced format so that it preferably does not cover other information or the picture currently displayed. When the final photograph in this slideshow is over which has a song ending at approximately the same time, the photo slideshow goes to a default screen, e.g., a black screen, and a title appears for the next slideshow, in this case, "Croatia 2008 Euro Champions—Congratulations" is displayed. New pictures and songs are delivered to the end user device relating to this topic as have been previously programmed. At some time or times during this slideshow, a reminder bug can be displayed reminding the viewers that they can vote for the next slideshow. In this case, the next program is a user city choice slideshow with the options of London, Madrid or Berlin based upon the highest vote tally. Each user can then click on the bug which then allows them to cast their vote.

Upon tallying the votes at the control server 222, suppose that it is determined that London won the vote. According to exemplary embodiments, the control server 222 coordinates the activities of the photo server 216 and audio server 224 such that the programmed selection London is broadcast to all end users connected to this multicast channel, e.g., with a song associated with London, e.g., London Calling, being streamed from audio server 224 and pictures associated with London being streamed from photo or video server 226. The control server 222 can also update the playlist 210 to reflect the voted in program. Again, partway through the slideshow, a reminder bug can appear reminding people that in, for example, 10 minutes the next slideshow begins titled "Europe today". Additionally, the bug can prompt users to submit their pictures of Europe prior to the program start time for possible inclusion in the program. These pictures can come from currently taken photos from a cell phone, a digital camera or stored pictures. Additionally, options can be provided for the submitter/photographer to submit their name and/or a title of the photograph. These pictures could be filtered automatically as directed by software and hardware associated with program content function 228, or manually by a person.

Additionally, either software or a person, possibly in conjunction with a database, e.g., program content function 228, can create tags for the pictures for denoting association with previously tagged songs or vice versa. For example, pictures of London could be tagged with "London" or "England" and pictures of the Alps could be tagged with "European Mountains" and mapped to appropriate songs. As can be seen, a variety of methods exist for associating photographs with songs and creating a plurality of programs as desired from these various combinations. All such variations for linking photographs with songs for creating programs should be considered to be within the scope of these exemplary embodiments. Additionally, such exemplary features can be used to create digital dedications for special events, e.g., "Croatia 2008 Euro Champions—Congratulations", for individuals or for businesses.

According to other exemplary embodiments, advertisements can be shown on Story Channel. Links, advertising advertisements or banners can be displayed on any of the pages associated with Story Channel or as part of a multicast. For example, while watching and listening to the Ireland 302 broadcast, advertisements can appear between photos with audio as desired (which are timed to match song endings), during photos (if the advertisement is a silent advertisement) and/or between programs. These advertisements could be traditional advertisements shown on TV, or advertisements tailored to the specific media content being seen and heard by the end user. Alternatively, as an interactive use, user created advertisements could be uploaded, filtered and displayed as desired.

According to another exemplary embodiment, multiple multicast channels can be used for the same program. For example, a first multicast channel for Rock could have photographs at a high resolution being transmitted, while a second multicast channel for "Rock" could transmit photographs at a lower resolution. When an end user device joins the "Rock" channel, information is transmitted between the end user device, e.g., cell phone 2, and the control server 222 for directing the end user device to join the channel which best matches its photo or video viewing capabilities. Additionally, bandwidth of the connection can also be used in making the determination of which "Rock" multicast channel to join.

According to another exemplary embodiment, visual and audio media content can be transmitted as a unicast. The above described exemplary systems and methods can be performed in a similar manner but over a unicast channel instead of a multicast channel.

Figure 8:
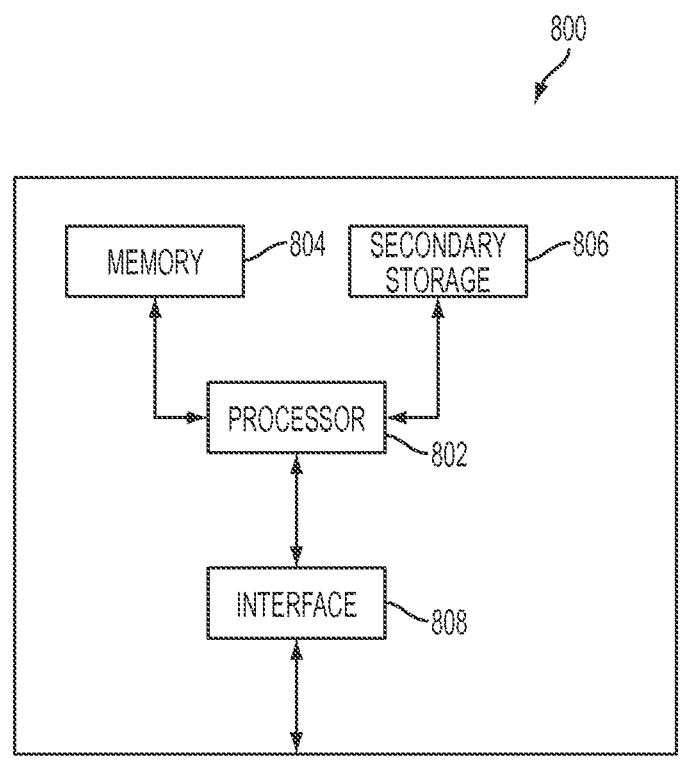
FIG. 8 shows a communications node according to exemplary embodiments.
Figure 9:
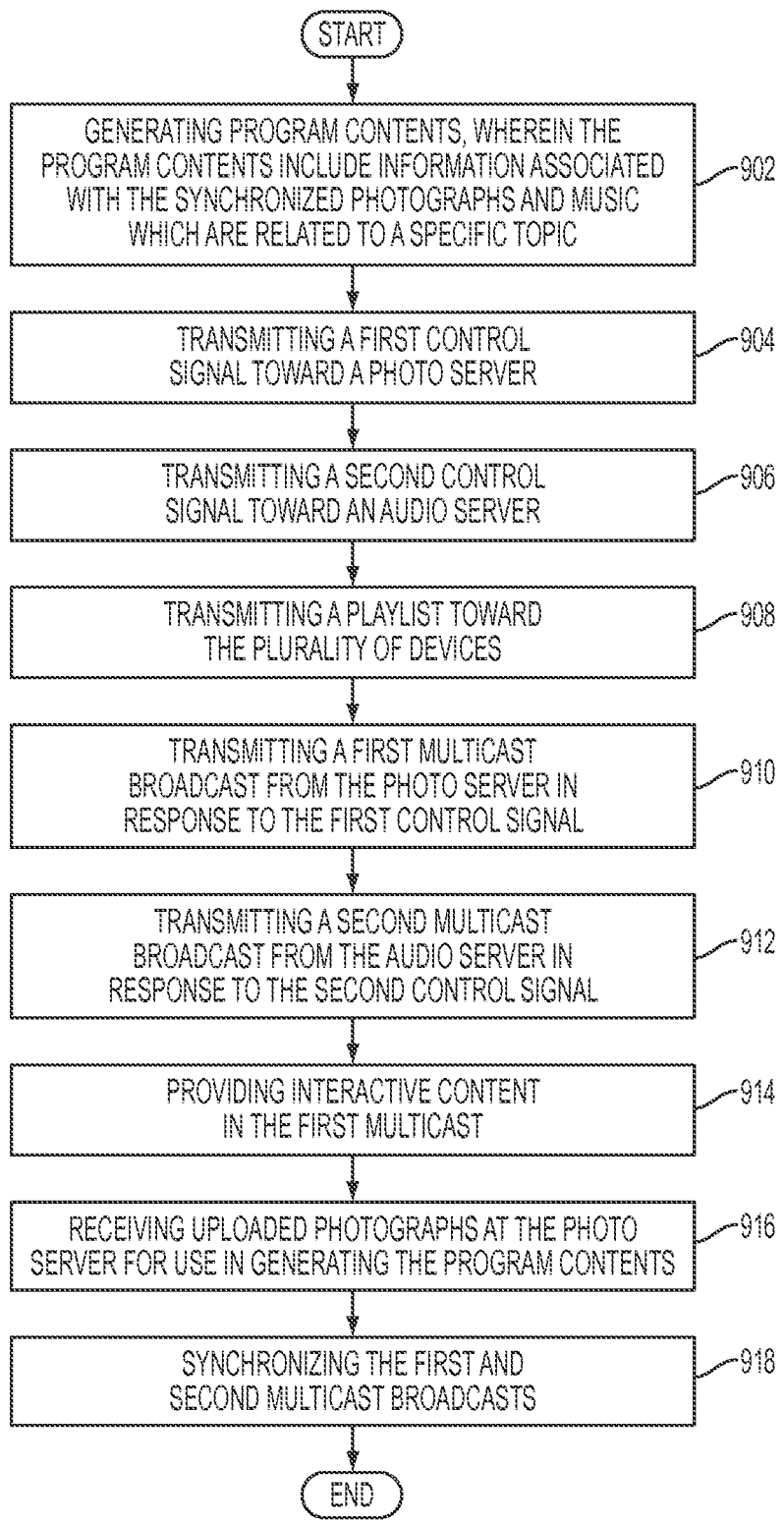
FIG. 9 is a method flow diagram for broadcasting synchronized photographs and music to a plurality of devices according to an exemplary embodiment.

The exemplary embodiments described above provide for visual and audio media content to be delivered to end user devices in a synchronized manner as well as allowing interactive functions. An exemplary communications node 800 which can perform the functions of the control server 222 will now be described with respect to FIG. 8. Communications node 800 can contain a processor 802 (or multiple processor cores), a memory 804, one or more secondary storage devices 806 and an interface unit 808 to facilitate communications between communications node 800 and other networks and devices. Processor 802, typically in conjunction with software on a computer readable medium, is capable of performing the controls to coordinate photo server 216, audio server 224, program content function 228 and various end user devices for keeping the visual and audio media in acceptable synchronization. Additionally, communications node 800 is capable of handling user requests, accepting/processing instructions for filtering images performing the duties of a web hosting service for services, such as, Story Channel as described above.

Using the above described exemplary embodiments, a method for broadcasting multimedia is provided. Initially a method for broadcasting synchronized photographs and music to a plurality of devices includes: generating program contents, wherein the program contents include information associated with the synchronized photographs and music which are related to a specific topic in step 902; transmitting a first control signal toward a photo server in step 904; transmitting a second control signal toward an audio server in step 906; transmitting a playlist toward the plurality of devices in step 908; transmitting a first multicast broadcast from the photo server in response to the first control signal in step 910; transmitting a second multicast broadcast from the audio server in response to the second control signal in step 912; providing interactive content in the first multicast in step 914; receiving uploaded photographs at the photo server for use in generating the program contents in step 916; and synchronizing the first and second multicast broadcasts in step 918.

As described above, the hardware and communication links shown in FIG. 2 can be used to deliver media to an end user. Additionally, according to exemplary embodiments, these communication links and hardware can be used to allow for two way interactions to occur with an end user device. For example, uplinked photographs 204 can be sent from an end user device to photo server 216. Additionally, requests 208 (or other information) can be sent from end user devices. For example, requests 208 could include queries from an end user device to access various links associated with the web site of the service provider or responses to voting questions.

The above-described exemplary embodiments are intended to be illustrative in all respects, rather than restrictive, of the present invention. Thus the present invention is capable of many variations in detailed implementation that can be derived from the description contained herein by a person skilled in the art. For example, the above described systems and methods could be used on other displays such as dummy terminals in an office, as a screen saver or even on an electronic billboard. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for broadcasting synchronized photographs and music to a plurality of devices comprising:
   transmitting a first control signal toward a photo server;
   transmitting a second control signal toward an audio server;
   transmitting a playlist toward said plurality of devices;
   transmitting a first broadcast from said photo server in response to said first control signal;
   transmitting a second broadcast from said audio server in response to said second control signal;
   providing interactive content in said first broadcast;
   receiving uploaded photographs at said photo server; and
   synchronizing said first and second broadcasts.

2. The method of claim 1, wherein said interactive content is at least one of a polling question or an interactive advertisement.

3. The method of claim 1, wherein tags associated with at least one topic are attached to said photographs and said music.

4. The method of claim 1, further comprising:
   generating program contents, wherein said program contents include information associated with said synchronized photographs and music which are related to a specific topic.

5. The method of claim 4, wherein said step of generating program contents further comprises:
   filtering said photographs prior to including said photographs in said program contents.

\* \* \* \* \*